United States Patent [19]

Brozek et al.

[11] Patent Number: 5,138,024
[45] Date of Patent: Aug. 11, 1992

[54] MODIFIED POLYESTER USEFUL AS PHOTOGRAPHIC ROLL FILM SUPPORT

[75] Inventors: Carl T. Brozek, Webster; Robert C. Daly, Greece; Robert H. Fehnel, Rochester; Constantine C. Petropoulos, Webster, all of N.Y.

[73] Assignee: Eastman Kodak Company, Rochester, N.Y.

[21] Appl. No.: 645,945

[22] Filed: Jan. 25, 1991

[51] Int. Cl.$^5$ .............................................. C08G 63/20
[52] U.S. Cl. .................................. 528/272; 528/279; 528/283; 528/285; 528/286; 528/293; 528/295; 528/300; 528/302; 528/308; 528/308.6; 524/711; 524/713; 524/779; 264/176.1; 264/210.7
[58] Field of Search .............. 528/272, 279, 283, 285, 528/286, 293, 295, 300, 302, 308, 308.6; 524/711, 713, 779; 264/176.1, 210.7

[56] References Cited

U.S. PATENT DOCUMENTS

| | | | |
|---|---|---|---|
| 3,546,008 | 12/1970 | Shields et al. | 428/395 |
| 3,734,874 | 5/1973 | Kibler et al. | 524/603 |
| 4,183,749 | 1/1980 | Yabe et al. | 430/211 |
| 4,202,785 | 5/1980 | Merrill et al. | 430/106 |
| 4,217,441 | 8/1980 | Bayless | 528/293 |
| 4,241,170 | 12/1980 | Bayless | 430/533 |
| 4,639,504 | 1/1987 | Cottis | 528/176 |
| 5,057,403 | 10/1991 | Kume et al. | 430/446 |

FOREIGN PATENT DOCUMENTS

0334367A3  9/1989  European Pat. Off. .

OTHER PUBLICATIONS

Irganox 1010, Ciba–Geigy, Antitoxidant and Thermal Stabilizer, 1990.
Antioxidants Product guide, GE Specialty Chemicals, ®1986.
Stabilization of Poly(Ethylene Terephthalate) with Ultranox ® 626, Technical Bulletin 17A, GE Specialty Chemicals, Undated.
Weston Phosphites Product Guide, Technical Publication CA-40018, GE Specialty Chemicals, ®1980.

*Primary Examiner*—John Kight, III
*Assistant Examiner*—S. A. Acquah
*Attorney, Agent, or Firm*—Robert A. Gerlach; Joshua G. Levitt

[57] ABSTRACT

A copolyester is synthesized by reacting a dialkyl ester of an aromatic dicarboxylic acid (e.g., dimethyl terephthalate) with ethylene glycol, low molecular weight poly(ethylene glycol) and a salt of a sulfonic acid-substituted aromatic dicarboxylate (e.g., sodium sulfoisophthalic acid) simultaneously in a first stage reaction in the presence of a phosphite or phosphate stabilizer. The intermediate product of the first stage is further reacted in a second stage in the presence of a polycondensation catalyst to obtain a random copolyester of the desired molecular weight. The copolyester is extruded to form a film which, after orientation and heat setting, has excellent clarity and is useful as a photographic film support. Aqueous processing of the film relaxes any core set or curl.

16 Claims, No Drawings

MODIFIED POLYESTER USEFUL AS PHOTOGRAPHIC ROLL FILM SUPPORT

FIELD OF THE INVENTION

This invention relates to a copolyester and its method of synthesis and, more particularly, to a film made therefrom which is useful as a photographic roll film support.

BACKGROUND

Cellulose triacetate has served as the film support for photographic roll films for many years. Its use continues because it has a good balance of physical properties and particularly because of two quite useful properties. First, after being wound on a core or reel as a camera roll film and acquiring the usual curl or "core set", triacetate film relaxes and becomes almost completely flat during aqueous development. Second, it is easy to cut and to perforate.

A problem, however, with cellulose triacetate is that films of high quality can be made from it only by coating or "casting" from a solvent mixture. It softens at such a high temperature that films made from it by melt extrusion have excessive thermal decomposition and color formation. Solvent casting uses expensive solvent mixtures and employs expensive solvent recovery equipment to comply with environmental requirements.

Melt-extruded poly(ethylene terephthalate) film has been used as a support for sheet films such as X-ray films. As a roll film support, however, it has two important drawbacks. First, it is too tough. Consequently, it is difficult to slit and perforate and it stretches rather than breaks when put under stress. Second, it does not quickly relax its core set or curl when processed in warm aqueous solutions. This means that the poly(ethylene terephthalate) film, which develops core set when wound around a film core, does not become flat after development and drying.

A need exists for a polymer from which roll films of photographic quality can be made without the use of solvents. The present invention provides such a polymer, from which films can be made by melt extrusion rather than solvent casting, which films meet the stringent requirements of photographic films, including being easy to cut and perforate and exhibiting curl relaxation after aqueous processing.

BRIEF SUMMARY OF THE INVENTION

The method of the invention for synthesizing a colorless, melt-extrudable, film-forming polymer comprises
  (A) in a first reaction stage forming an intermediate product by heating a reaction mixture comprising
    (1) an aromatic dicarboxylic acid or a dialkyl ester thereof,
    (2) ethylene glycol,
    (3) an aromatic dicarboxylic acid having a sulfonic acid salt substituent on its aromatic ring or a dialkyl ester of such dicarboxylic acid,
    (4) a poly(ethylene glycol) of low molecular weight,
    (5) a catalyst for ester interchange when the reaction mixture contains a dialkyl ester of a dicarboxylic acid,
    (6) a phosphite or phosphate stabilizer compound which is free of strong acid, and
    (7) a buffer compound,
  (B) in a second reaction stage, heating the intermediate product formed in stage (A) at a higher temperature and reduced pressure in the presence of a polycondensation catalyst and in the presence of a phosphite or phosphate stabilizer which is free of strong acid and recovering a random copolyester which is free of unincorporated poly(ethylene glycol) and from which is melt extrudable a film which, after biaxial orientation and heat setting, has low haze, high modulus, low elongation-to-break and curl after aqueous processing of less than about 2.5 $mm^{-1}$.

The novel polyester of the invention is a random copolyester of at least four monomers, namely (1) an aromatic dicarboxylic acid or a dialkyl ester thereof, (2) ethylene glycol, (3) an aromatic dicarboxylic acid having a sulfonic acid salt substituent on its aromatic ring or a dialkyl ester thereof and a low molecular weight poly(ethylene glycol). In a preferred embodiment, the copolyester is of low molecular weight, as indicated by an Inherent Viscosity below about 0.45 dl/g.

From the novel copolyester a film of the invention is made. It is a melt extruded, biaxially oriented and heat set film and has a low haze, high modulus, low elongation-to-break and post-processing curl of less than 2.5 $mm^{-1}$. In a preferred embodiment, the film of the copolyester having an Inherent Viscosity below about 0.45 dl/g is biaxially oriented at least 2.5 to 1 in both directions.

DETAILED DESCRIPTION

As used herein, the following terms have the meanings indicated:

"Percent Transmission" means the percentage of incident light across the entire visible spectrum which is transmitted by film having a thickness of 4 mils (0.1 mm). The value is measured by the procedure of ASTM D1003, Standard Method Test for Haze and Luminous Transmittance of Transparent Plastics.

"Yellowness Index" means the value measured for a film having a thickness of 4 mils (0.1 mm) according to ASTM D1925, Standard Test Method for Yellowness Index for Plastics.

"Colorless" means having a Yellowness Index less than 4.

"Refractive Index" means the value measured according to ASTM D542-50, Standard Test Method for Index of Refraction of Transparent Organic Plastics.

"Percent Haze" means the value measured for a film having a thickness of 4 mils (0.1 mm) according to ASTM D1003.

"Elastic Modulus" means the value in GPa measured according to ASTM D882, Standard Test Method for Tensile Properties of Thin Plastic Sheeting.

"Percent Elongation to Break" means the percentage measured according to ASTM D882.

"Breaking Strength" means the value in MPa measured according to ASTM F882.

"Tear Strength" means the value in g/5 mil measured according to ASTM D1938.

"Heat Distortion Temperature" is the temperature in degrees C measured according to ASTM D1637, Standard Test Method for Tensile Heat Distortion of Plastic Sheeting.

"Humidity Expansion Coefficient" means the value measured according to ANSI PH 1.32.

"Core Set" is a value measured after winding a strip of 35 mm film on a core of 12 mm diameter, storing at 50° C. for 16 hours and then removing the film from the core. The lengthwise curvature of the film is then measured with an ANSI curl gauge according ANSI PH 1.29 (1971). The reciprocal of the radius (R) in mm of the curvature of the film multiplied by 100 is the measured value (100/R, mm$^{-1}$).

"Post Processing Curl" (abbreviated as PP Curl) is the measured value on an ANSI curl gauge according to ANSI PH 1.29 (1971) for a film strip which, after the "Core Set" measurement, is soaked in water for 10 minutes at 38° C. and then equilibrated to 20° C. and 50% Relative Humidity. As with "core set", the measured value is the reciprocal of the radius, R, in mm of the curvature of the film multiplied by 100 (100/R, mm$^{-1}$).

"IV" means the Inherent Viscosity of a polymer as measured with a Ubbelohde viscometer at 25° C. in a solvent consisting of phenol and chlorobenzene (60:40 parts by weight), the polymer concentration being 0.25 g per 100 ml of solution and the solution being 0.05N in tetrabutyl ammonium bromide.

As the Summary of the Invention and the claims of this application indicate, the novel copolyester from which photographic roll films can be melt cast, is a condensation polyester formed by the reaction of at least four component monomers, namely, an aromatic diacid or diester, a salt of a sulfoaromatic diacid or diester, ethylene glycol and a low molecular weight poly(ethylene glycol). Since one of the monomers is an ionic salt of a sulfoaromatic diacid or diester, the polymer can be referred to as polyesterrionomer.

Although the copolyester contains at least the four indicated monomer components, it can also contain other monomer components provided they do not change the polymer so greatly that it no longer possesses the unexpected combination of properties of the new polymer.

The combination of properties of the novel polyester provides an important advance in the development of a melt castable photographic film base. This combination which has heretofore not been attained with a polyester film includes, most importantly, relaxation of curl after aqueous processing. In this regard the new film is substantially as good as solvent-cast cellulose triacetate film, which is the standard for photographic roll film.

Relaxation of curl by itself, is not sufficient to qualify the film as a photographic film. It must also be colorless, as defined herein. In addition it must have a reasonably high elastic modulus. Still further, the film must have good clarity—a quality which is measured in terms of percent haze.

A further important quality of the new copolyester composition is that it is substantially free of unincorporated poly(ethylene glycol), by which is meant that it contains less that 0.3 weight percent and, preferably, less than 0.1 weight percent thereof. The properties of the copolyester, e.g., clarity, are, therefore, markedly better than those of copolyester made from the same reactants but by other procedures which result in the presence of unincorporated poly(ethylene glycol) in the polymer. In this sense, unincorporated means free poly(ethylene glycol), which can be an unreacted portion of the original reactant or material formed by degradation of the copolyester.

In accordance with the present invention, this desirable combination of properties, which heretofore has not been achieved in non-cellulosic, melt cast film is made possible by a method of manufacture which comprises applying certain method steps to particular materials. The result is a random copolyester of at least four monomers, which meets the need for a melt castable film base to replace cellulose triacetate.

In addition to these basic qualities, certain preferred embodiments of the new copolyester film have other properties which make the film especially valuable as a photographic roll film. Thus, a preferred embodiment has a low elongation-to-break. The lower elongation-to-break results in less formation of contaminating fragments during the slitting and perforating operations of film manufacture. The preferred embodiment also has a lower tear strength than conventional polyester films and consequently will break when a malfunction occurs and not damage apparatus such as autowind cameras and motion picture projectors. Also, the preferred embodiment, in comparison to tough conventional poly(ethylene terephthalate) film, is easier to cut, slit and perforate.

To make orientable polyester film it has previously been thought necessary to keep the IV of film-forming polyesters preferably above about 0.60 and, in any event, above 0.5. For example, poly(ethylene terephthalate) of IV below 0.5 either cannot be heated and stretched for biaxial orientation or the films thereof are too brittle. Consistent with this, it is seen that the specific copolyester described in European Patent Application 334367 A2 had an intrinsic viscosity of 0.65 measured in o-chlorophenol at 25° C. The copolyester of the present invention can have low IV and, hence, be easily cut and perforated, yet be amenable to biaxial orientation at stretch ratios of at least about 0.25 to 1, e.g., 3–4 to 1. The IV of the preferred copolyesters of the invention is below about 0.45 and preferably is in the range from about 0.35 to 0.45 dl/g.

In the method of the present invention, the synthesis of the polyester takes place in at least two stages, the first stage being an esterification or ester interchange stage and the second being a polycondensation stage. The first stage forms an intermediate product which can also be called an oligomer. In the second stage, the copolyester of the desired IV or molecular weight is formed from the intermediate product. A characteristic of the new method is that all four monomers are present in the first reaction stage, as well as the catalyst or catalysts and the phosphite or phosphate stabilizer, the latter being free of strong acid. This defines a marked difference from the prior art synthesis described in the patents to Bayless, U.S. Pat. Nos. 4,217,441 and 4,241,170. These patents say that in polyester manufacture, high molecular weight poly(ethylene glycols) can be added at any point in the process. They further say, however, that it is preferred to add the poly(ethylene glycol) late in the process to minimize degradation. They also say that it is preferred to add the sulfonate late in the process.

In contrast to the procedure suggested by Bayless, the applicants are able to introduce poly(ethylene glycol) of low molecular weight and a sulfonic acid salt monomer as initial reactants in the first reaction stage along with a phosphite or phosphate stabilizer which is free of strong acid. Contrary to indications of the prior art regarding reactant degradation and color formation, the applicants' method avoids such problems and produces a colorless product cf excellent clarity and physical properties.

Also in contrast to the prior art, the method of the present invention yields a copolyester which not only is clear and substantially free of degradation products, but which is a random condensation polymer of the four monomers. Prior art polyesters either do not include four monomers, and therefore do not have the combination of properties required for a hydrophilic photographic roll film, or, as in the Bayless patents, they incorporate the four monomers in a non-random distribution.

The achievement of random distribution of the monomers in the chain of the copolyester of this invention results from the fact that the four monomers are reacted simultaneously and not sequentially.

A random copolyester, as the term is used herein, means a homogeneous polymer formed by reacting all of the monomers simultaneously and in which the ionic monomer (e.g., salt of sulfoisophthalic acid or its diester) and the poly(ethylene glycol) are randomly distributed along the polymer chain backbone. Each polymer chain is statistically representative of the monomer reactant mixture. That is, each contains about the same ratios of the reactants.

Certain desired properties for photographic films result from the fact that the copolyester of the invention is a random copolymer. One is clarity or lack of haze. It is believed that a non-random copolymer results when poly(ethylene glycol) and/or the salt of sulfoaromatic diacid or diester are added late in the synthesis. The latter procedure forms a product having a high level of water-extractable material and is believed to result in the formation of lengthy blocks in the polyester chain that are rich in poly(ethylene glycol) or the salt of a sulfoaromatic diacid or diester. As a consequence of such extractable material and blocks, films made from the polymers are hazy and do not have the clarity required for high quality photographic film.

Another problem is that a film of polymer containing such unreacted monomers and oligomers can have undesirable photographic activity. Furthermore, such materials can exude from the film, thus changing the film properties and creating contamination.

The preferred aromatic diester reactant for the polyesters of the invention is dimethyl terephthalate (abbreviated as DMT). Other lower alkyl diesters of aromatic dicarboxylic acids can also be used instead of or in addition to DMT. Examples include dimethyl and diethyl esters of isophthalic acid and similar esters of 2,6- and 1,4-naphthalene dicarboxylic acid. A mixture of such aromatic diesters can also be used. Although there are advantages of diester (lower temp) in 1st stage, corresponding diacid can be used.

The preferred sulfonic salt-substituted diacid or diester is 5-sodium sulfoisophthalic acid or the dimethyl ester thereof. Also useful are other lower dialkyl esters of this sulfo aromatic diacid as well as other sulfo aromatic diacids (or the lower dialkyl esters) such as 2-sodium sulfoterephthalic acid, 4-sodium sulfophthalic acid, 5-(4-sodium sulfophenoxy) isophthalic acid, 4-sodium sulfo-2,6-napthalene dicarboxylic acid. Also useful are corresponding salts of metals other than the sodium, for example, other alkali metals and, preferably, potassium and lithium.

It is preferred that the copolyester be synthesized by the reaction of the indicated dialkyl esters of an aromatic diacid and a sulfonic substituted diacid. An advantage of using diesters instead of the free acids is that a lower reaction temperature can be used in the first stage. On the other hand, if desired the diacids can be used instead of the diesters. In that event, an ester interchange catalyst is not required in the first stage. The reaction of the diacids and diols proceeds without an added catalyst.

The poly(ethylene glycol) used in the method of the invention is a low molecular weight poly(ethylene glycol) having a number average molecular from about 300 to 2000. The preferred molecular weight range is from about 300 to 1600 and, most preferably, is from about 300 to 500.

The poly(ethylene glycol) can be represented by the formula:

$$HO(CH_2CH_2O)_pCH_2CH_2OH$$

wherein p is an integer from about 5 to 42. Preferably p is from about 5 to 35 and, most preferably is from 5 to 10.

When the low molecular weight poly(ethylene glycol) component of the reaction mixture has the preferred number average molecular weight from about 300 to 500, the copolyester of the invention has a relatively low percent elongation-to-break and a relatively high elastic modulus, as compared with copolyester made with poly(ethylene glycol) of higher molecular weight. More particularly, the percent elongation-to-break, as measured according to ASTM D882, is in the range of 20 to 50 percent when the poly(ethylene glycol) of the preferred lower molecular weight is used. This is advantageous in a number of uses of the copolyester as a photographic film support. Likewise, the copolyester is stiffer, i.e., has a higher elastic modulus (greater than 3.45 GPa) when the lower molecular weight poly(ethylene glycol) is used. Another advantage of the preferred poly(ethylene glycol) which has a number average molecular weight from 300 to 500 is that it is liquid at room temperature and, hence, can be handled more easily in the mixing of the reactants than can the solid poly(ethylene glycols) of higher molecular weight.

In the first reaction stage a molar excess of the lower boiling glycol, ethylene glycol, is used. Of the diesters or diacids, the aromatic dicarboxylic diacid or diester is the major part, comprising from 80 to 97 mole percent thereof, while the salt of a sulfonic-substituted aromatic diacid or diester comprise from 3 to 20 mole percent thereof.

The ratios of the composition of the novel polyester can be represented by the following formula:

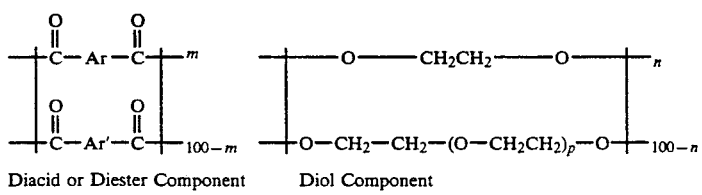

Diacid or Diester Component   Diol Component wherein Ar is an arylene ring such as phenylene or naphthalene, Ar' is an arylene ring such as phenylene or naphthalene which has a sulfonic salt substituent such as —SO₃M or

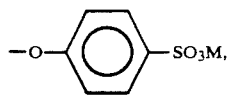

the latter being referred to as a sulfo-substituted phenoxy radical. The letter M represents a metal ion, preferably sodium, potassium or lithium, m is a mole percentage from 80 to 97, preferably, from 88 to 95, n is a mole percentage from 90 to 99.8, preferably, from 95 to 99.5 and p is an integer from 5 to 42, preferably from 5 to 10.

The first stage of the synthesis in accordance with the invention can be called the esterification or ester interchange stage. As previously mentioned, all four essential monomers, plus any minor amounts of optional monomers are present in the first reaction stage. If diesters of the acid component are used, the four monomers are also mixed with an ester interchange catalyst. These are known in the art. Examples include compounds of zinc, titanium, calcium and manganese, such as zinc acetate, titanium tetraisopropoxide, manganese acetate and calcium acetate . The catalyst for the second stage can also be present.

Also included in the first stage reaction mixture, in accordance with invention, is a phosphite or phosphate stabilizer which is free of phosphoric acid, phosphorous acid or any other strong acid. By "strong acid" is meant an acid which has a pH less than 3 in a 0.1N aqueous solution.

The adding of the phosphite or phosphate stabilizer which is free of strong acid to the reaction mixture inhibits the formation of color in the product and is believed to inhibit the formation of diethylene glycol. It also provides an important advantage in the preferred embodiment of the method in which the acid components are diesters and an ester interchange catalyst is present in the first reaction stage. Phosphate stabilizers, such as trioctyl phosphate, previously used in polyester synthesis, are believed to have contained contaminating amounts of phosphoric acid. The latter inactivates the ester interchange catalysts and causes an inordinately long reaction time to complete the ester interchange. The consequent long residence time of the reactants in the first stage results in degradation of poly(ethylene glycol) and also the formation of acetaldehyde (which has undesirable photographic activity) and colored materials. To obtain a colorless polyester it has been thought necessary, therefore, when poly(ethylene glycol) is a reactant, to add it only in the second stage of the synthesis. This results in reaction products which contain unreacted poly(ethylene glycol) and non-random copolyesters, the latter having some polymer chains with no poly(ethylene glycol) and others with large amounts, for example, at the end of a chain. Such products differ markedly in composition and properties from the copolyesters of the present invention.

In general, the phosphites useful in the method of the invention can be any organo-phosphite compound of the formula

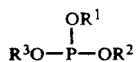

wherein $R^1$, $R^2$ and $R^3$ are the same or different alkyl or aryl radicals and wherein the phosphite compound is soluble, non-volatile and thermally stable. By soluble is meant that the compound is soluble in the reactants under the reaction conditions and in the product of the polyesterification reaction. By non-volatile is meant that little or none (i.e., no more than 5 weight percent) of the compound vaporizes under the reaction conditions of temperature and pressure. Vaporization can result in loss of the compound and of its stabilizing activity. By thermally stable is meant that little or none (i.e., no more than 5 weight percent) of the compound decomposes under the reaction conditions. This is an important requirement because decomposition can result in the formation of phosphorous acid, a strong acid as defined herein.

Examples of organic radicals $R^1$, $R^2$ and $R^3$ are phenyl and substituted phenyl radicals having one or more alkyl substituents such as t-butylphenyl, di-t-butylphenyl, tri-t-butylphenyl, n-nonyl phenyl and the like. Other suitable radicals $R^1$, $R^2$ and $R^3$ are alkyl of eight or more carbon atoms, e.g. isooctyl, isodecyl, octadecyl and the like. $R^1$ and $R^2$ can also together form an alkylene chain which completes a ring with the indicated oxygen and phosphorous atoms. The alkylene chain can be substituted and can share a common atom with a similar group as in the biphosphite compound I depicted below.

Phosphate compounds useful as stabilizers in the first stage in accordance with the method of the invention are compounds of the structure:

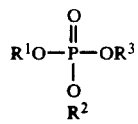

wherein $R^1$, $R^2$ and $R^3$ are the same as defined above. Like the phosphites, suitable phosphates should be soluble, non-volatile and thermally stable. The latter is important in accordance with the present invention, to avoid decomposition and the formation of phosphoric acid, a strong acid which inactivates the ester interchange catalysts. Although trialkylphosphates, with the alkyl groups having eight or more carbon atoms, e.g., trioctyl phosphate, can be used they do not have optimum stability and tend to slow down the ester interchange reaction. Hence, of the phosphates, triaryl phosphates are preferred.

An especially preferred stabilizer in the method of the invention is a biphosphite compound of the structure:

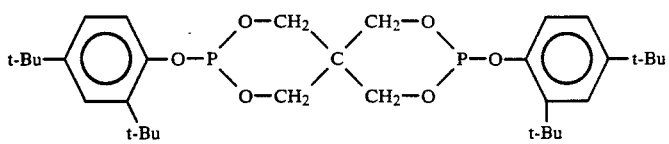

A product of this kind known as "Ultranox 626" phosphite is available from General Electric Speciality Chemicals, Inc. The copolyester made with this stabilizer is particularly desirable for its low yellowness index of less than 3.

Other preferred phosphites include triphenyl phosphite, trioctadecyl phosphite and distearyl pentalrythritol desphosphite. A composition containing the latter compound is available from General Electric Company (Specialty Chemicals Div.) under the name "Weston 619" phosphite.

As previously indicated, an important characteristic of the phosphite or phosphate stabilizer for the ester interchange stage in the method of the invention is that it is free of strong acid. The compound, therefore, should be hydrolytically stable so that it will not hydrolyze to form phosphoric acid or phosphorous acid under the reaction conditions.

A suitable concentration of phosphate or phosphite stabilizer for the first stage is in the range from about 0.01 to 0.2 weight percent based on the total theoretical yield of polyester. Larger amounts can be used but may cause gray color in the product. A preferred concentration is in the range from about 0.05 to 0.1 weight percent.

During the first stage reaction, the reaction mixture is heated and stirred in an inert atmosphere at, for example, 140° to 225° C. until the evolution of alkanol, e.g., methanol, in the ester interchange reaction (or the evolution of water if diacids are reactants) is stoichiometrically complete. The process then continues in a second reaction stage.

This stage, which can be called the polycondensation stage, is at a higher temperature, e.g., 230° to 285° C. and reduced pressure, e.g., as low as 0.1 mm Hg (ca. 12 Pa). The reaction is continued until the polymer reaches the desired end point as indicated by melt viscosity. In the method of the present invention this corresponds to a solution IV from about 0.35 to 0.45 dl/g.

Although, the catalyst for the second reaction stage can, if desired, be added during the second stage, it is preferred to include it in the initial reaction mixture. It does not interfere with the first stage reaction. Polycondensation catalysts of this type include, for example, compounds of antimony, titanium or germanium such as antimony trioxide, titanium tetraisopropoxide and germanium dioxide.

The amounts of catalyst for the first stage and the second stage can be substantially as used in known two-stage synthesis of poly(ethylene terephthalate), for example, 20 to 400 ppm of the metal component of the catalyst of each type, based on the weight of theoretical yield.

In addition to the described organic phosphate or phosphite which is present in a stabilizing amount, other addenda can be present. For example, an antioxidant compound can be useful. A preferred compound of this type is the hindered phenol compound, "Irganox 1010" antioxidant which is available from Ciba-Geigy Company. It is identified as tetrakis [methylene (3,5-di-tert-butyl-4-hydroxyhydro cinnamate)]. Other useful antioxidant compounds include other well known hindered phenols. They can be added in amounts, for example, of 0.01 to 0.2 weight percent of the reaction mixture.

A highly desirable additive for the reaction mixture is a buffer compound. Various alkali metal carboxylate compounds such as sodium, lithium and potassium carboxylates are especially useful. Sodium acetate is preferred. A suitable concentration to serve as a buffer and retard the formation of diethylene glycol is in the range from about 5 to 12 mole percent based on the sulfonic acid-substituted diester.

The copolyester films of the invention are made by melt extruding the novel copolyester, followed by biaxial orientation and heatsetting. The extrusion of the film can be carried out in known manner with conventional apparatus. Likewise, the orientation of the film can employ known drafting and tentering apparatus. The lengthwise stretching (also called machine direction stretching or drafting) and the widthwise stretching (also called transverse direction stretching or tentering) can be done either simultaneously or sequentially. Useful stretching temperatures are in the range from about 90° to 140° C., with 100° to 120° C. being preferred. Useful stretch ratios can be from about 2.5 to 1 to about 5 to 1, with from about 3–4 to 1 being preferred. The stretch ratio can be the same or different in each direction. This stretchability at low IV, e.g., at least 2.5 to 1 at IV below about 0.45 is a valuable property of the new copolyester which distinguishes it from poly(ethylene terephthalate).

Conventional film-forming polyesters are commonly manufactured to a low IV prepolymer in the initial two stage polymerization reaction. The isolated, solid pieces of the prepolymer are then heated with nitrogen flow to drive the molecular weight (IV) to the desired high value for film manufacture. This process is called "solid stating." This additional manufacturing step is not necessary in the method of the present invention since the polymers of the invention perform well at low IV's, i.e., they can be stretched and oriented to yield superior films.

After stretching, the film is heat set by heating the film for a period of time while restraining it against shrinkage. Suitable conditions include heating at 140° to 200° C., preferably 140° to 160° C., for 10 to 90 seconds, although 10 to 30 seconds can be sufficient. This copolyester crystallizes more slowly than poly(ethylene terephthalate). After heat setting, the film can be heat relaxed by heating to a temperature between the stretch temperature and the heat set temperature while releasing the widthwise restraint on the film.

The invention is further illustrated by the following examples:

EXAMPLE 1

Preparation of Copolyester with 1450 M.W. Poly(Ethylene Glycol)

A four-monomer copolyester was prepared by the reaction of dimethyl terephthalate (92.5 mole %), dimethyl 5-sodiosulfo isophthalate (7.5 mole %), ethylene glycol (99.25 mole %) and poly(ethylene glycol) (0.75 mole %). For this reaction a 20 gal stainless steel polymerization reactor was charged as follows:

17.95 kg of dimethyl terephthalate
2.2 kg of dimethyl 5-sodiosulfo isophthalate
1.09 kg of poly(ethylene glycol) of a nominal number average molecular weight of 1450 g/mole.
12.37 kg of ethylene glycol
60.75 g of anhydrous sodium acetate
21 g of "Irganox 1010," a hindered phenol oxidation inhibitor
21 g of "Ultranox 626" phosphite stabilizer Mechanical stirring was begun and the catalyst system, consisting of 4.6 g of zinc acetate dihydrate and 8.4 g of antimony trioxide, was added. Then the reactor was warmed to 190° C. under a nitrogen stream.

Distillation of methanol began as the temperature passed 160° C. and was substantially complete within two hours at 190° C.

The temperature controller was set to reach 275° C. When the temperature exceeded 240° C., the pressure within the reactor was gradually reduced to 100 mm Hg. As the temperature continued to rise, the pressure was also reduced. At the completion of the reaction, the temperature was 275° C. and the pressure was 0.4 mm Hg. The excess ethylene glycol distilled out of the reaction mixture and the melt viscosity increased dramatically.

The reaction was stopped when the pressure on the hydraulically driven stirrer increased from an initial 150 psi at 30 RPM to 420 psi at 12 RPM. The polymerization was terminated by breaking vacuum and dropping the resin onto stainless steel pans.

EXAMPLE 2

Preparation of Copolyester with 1450 M.W. Poly(Ethylene Glycol)

Another four-monomer copolyester was prepared by the reaction of dimethyl terephthalate (95 mole %), dimethyl 5-sodiosulfo isophthalate (5 mole %), ethylene glycol (99.25 mole %) and poly(ethylene glycol) 0.75 mole %).

This polymer was prepared exactly as above except that the following initial materials charge was used:

18.44 kg dimethyl terephthalate
1.47 kg dimethyl 5-sodiosulfo isophthalate
1.1 kg of poly(ethylene glycol) with a nominal number average molecular weight of 1450 g/mole.
12.31 kg of ethylene glycol
41 g of anhydrous sodium acetate
21 g of "Irganox 1010" antioxidant
21 g of "Ultranox 626" biphosphite stabilizer After initial stirring, the catalyst system (4.6 g zinc acetate dihydrate and 8.4 g antimony trioxide) was added.

EXAMPLE 3

Preparation of Copolyester with 400 M.W. Poly(Ethylene Glycol)

Still another four-monomer copolyester was prepared by the reaction of dimethyl terephthalate (90 mole %), dimethyl 5-sodiosulfo isophthalate (10 mole %), ethylene glycol (95 mole %) and poly(ethylene glycol) of low molecular weight (5 mole %). For this reaction a 150 gal stainless steel polymerization reactor was charged as follows:

262.2 kg dimethyl terephthalate
44.4 kg dimethyl 5-sodiosulfo isophthalate
30.0 kg of poly(ethylene glycol) with a nominal number average molecular weight of 400
181.61 kg of ethylene glycol
1.23 kg of sodium acetate (anhydrous)
0.331 kg of "Irganox 1010" antioxidant
0.331 kg of "Ultranox 626" biphosphate stabilizer Zinc acetate dihydrate (0.072 kg) and antimony trioxide (0.131 kg) were added. Stirring was begun and then the mixture was warmed under nitrogen and the temperature was programmed to rise gradually to 220° C. Methanol began to distill from the reactor when the temperature reached 140° C. The full calculated amount of methanol had distilled out within 4 hours.

With all of the methanol out and the temperature of the reactor contents above 220° C., the pressure within the reactor was reduced to 100 torr. The temperature of the contents was raised gradually toward 275° C. At 240° C. the pressure was reduced to 10 torr. Finally, when the temperature was above 260° C. the reactor was fully opened to a pumped vacuum and a pressure of 0.5 torr. was obtained. Ethylene glycol was distilling throughout this period under reduced pressure.

The build up of polymer molecular weight manifested itself as an increase in the power required to stir the melt. Stirrer RPM's were dropped from the original 50 to 8 at the completion of the polymerization. The polymerization was terminated by opening the reactor to nitrogen when the torque reading increased from an initial 200 pound-inches at 50 RPM to 16,000 pound-inches at 8 RPM at 275° C.

The polymer was isolated by dropping it out of the reactor into stainless steel trays. Pellets were prepared by pushing the molten resin through a die to make a strand. The strand was pulled through a water bath to a chopper.

Film Preparation

The polymers of the above examples were extruded, biaxially oriented (first in the machine direction and then transversely) and heat set to yield films. The process temperatures and degrees of stretching (stretch ratios) for each example are shown in Table I below.

TABLE I

| Example | IV dl g | Tg °C. | Tm ONSET °C. | EXT. TEMP °C. | STRETCH TEMP °C. | HEAT SET TEMP °C. | STRETCH RATIO MD × TD | ELASTIC MODULUS GPa | POST PROCESS CURL mm$^{-1}$ | ELONGATION TO BREAK % |
|---|---|---|---|---|---|---|---|---|---|---|
| (1) | 0.443 | 64 | 227 | 253 | 120 | 136 | 3.9 × 3.4 | 3.3 | 0.78 | 40 |
| (2) | 0.398 | 73 | 232 | 242 | 100 | 126 | 3 × 3 | 3.7 | 2.2 | 32 |
| (3) | 0.402 | 64 | 211 | 275 | 120 | 150 | 4 × 3 | 3.8 | 1.56 | 61 |

In Table I, Tg means glass transition temperature, Tm means melting temperature, EXT. TEMP means temperature at which the polymer was extruded as a film, STRETCH TEMP means the temperature at which the extruded film was drafted and tentered, HEAT SET TEMP means the temperature at which the biaxially oriented film (drafted and tentered) was heat set, MD means the ratio of stretch in the machine direction (drafting), and TD means the ratio stretch in the transverse direction (tentering). The results in the table show that each of the films of the invention had excellent physical properties and very low post-processing curl. In addition the films had haze measurements less than 2 percent and a yellowness index less than 3.

The novel copolyester films of the invention are free of photographically active substances such as poly(ethylene glycol). In addition, the films have excellent clarity and most of the core set or curl in the film can be permanently relaxed by soaking in an aqueous bath. Because of these and other valuable properties the films are especially useful, as already mentioned, as supports for light-sensitive, silver halide photographic roll films.

To make such a photographic product the copolyester film is coated with one or more aqueous light-sensitive layers and other layers of known types. After imagewise exposure in a roll film camera, the films can be processed in aqueous developers of known compositions with excellent results, the processed negatives being substantially free of post-processing curl.

The invention has been described with reference to certain preferred embodiments but it will be understood that variations and modifications can be made within the spirit and scope of the invention.

We claim:

1. The method of synthesizing a colorless, melt-extrudable, film-forming polymer which comprises
   (A) in a first reaction stage forming an intermediate product by heating a reaction mixture comprising
      (1) an aromatic dicarboxylic acid or a dialkyl ester thereof,
      (2) ethylene glycol,
      (3) an aromatic dicarboxylic acid having a sulfonic acid salt substituent on its aromatic ring, or a dialkyl ester of such dicarboxylic acid,
      (4) a poly(ethylene glycol) of low molecular weight,
      (5) a catalyst for ester interchange when the reaction mixture includes a dialkyl ester of a dicarboxylic acid,
      (6) a phosphite or phosphate stabilizer compound which is free of strong acid; and
      (7) a buffer compound;
   (B) in a second reaction stage, heating the intermediate product formed in stage (A) at a higher temperature and reduced pressure in the presence of a polycondensation catalyst; and recovering a random copolyester which is substantially free of unincorporated poly(ethylene glycol) and from which is melt extrudable a film which, after biaxial orientation and heat setting, has low haze, high modulus, low elongation-to-break and post-processing curl of less than about 2.5 mm$^{-1}$.

2. A method according to claim 1 wherein the reaction mixture in the first reaction stage comprises
   (1) a dialkyl ester of a dicarboxylic acid,
   (2) a dialkyl ester of an aromatic dicarboxylic acid having a sulfonic acid salt substituent on its aromatic ring, and
   (3) a catalyst for ester interchange and a polycondensation catalyst.

3. A method according to claim 2 wherein the reaction mixture in the first reaction stage comprises a phosphite stabilizer.

4. A method according to claim 3 wherein the phosphite stabilizer is a compound of the formula:

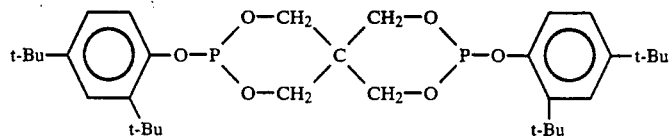

5. A method according to claim 3 wherein the polycondensation catalyst comprises a compound of antimony, germanium or titanium.

6. A method according to claim 4 wherein the poly(ethylene glycol) has a number average molecular weight from about 300 to 1600.

7. A method according to claim 5 wherein the reaction mixture comprises
   (1) dimethyl terephthalate,
   (2) ethylene glycol, and
   (3) dimethyl isophthalate having a sulfonic acid salt substituent on its aromatic ring.

8. A method according to claim 6 wherein the isophthalate is an alkali metal salt of dimethyl 5-sulfoisophthalate.

9. A method according to claim 7 wherein the poly(ethylene glycol) has a number average molecular weight from about 300 to 500.

10. A method according to claim 3 wherein the reaction mixture in the first stage also contains an antioxidant.

11. A method according to claim 10 wherein the antioxidant is a hindered phenol.

12. A random copolyester which comprises repeating units of the structure:

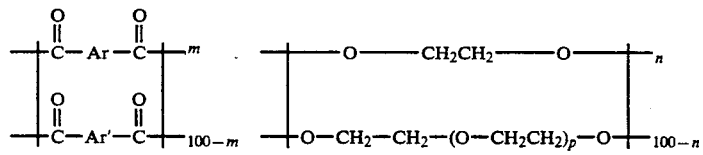

wherein m is a mole percentage from 80 to 97, n is a mole percentage from 90 to 99.8 and p is an integer from 5 to 42; Ar is an arylene radical; and Ar' is an arylene radical having a sulfonic acid salt substituent on its aromatic ring; said copolyester being substantially free of unincorporated poly(ethylene glycol) and having an Inherent Viscosity from about 0.35 to 0.45 dl/g.

13. A copolyester according to claim 12 wherein Ar is 1,4-phenylene and Ar' is 1,3-phenylene having a sulfonic acid salt substituent and p is an interger from 5 to 10.

14. A melt extruded film of a random copolyester which comprises repeating units of the structure:

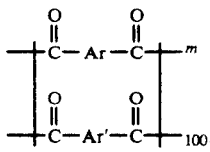 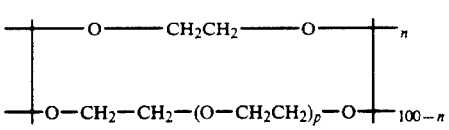

wherein m is a mole percentage of from 80 to 97, n is a mole percentage from 90 to 99.8 and p is an integer from 5 to 42; Ar is an arylene radical; Ar' is an arylene radical having a sulfonic acid salt substituent on its aromatic ring; said film after being biaxially oriented and heat set, being colorless, having a haze less than 2, an elastic modulus of at least 3.3 GPa, and post-processing curl of less than 2.5 mm$^{-1}$.

15. A film according to claim 14 wherein said copolyester is formed from dimethyl terephthalate, dimethyl sulfo-isophthalate alkali metal salt, ethylene glycol and poly(ethylene glycol) of molecular weight from about 300 to 500 and has an Inherent Viscosity below about 0.45 dl/g.

16. A film according to claim 14 wherein the copolyester has an Inherent Viscosity below about 0.45 dl/g and the film is biaxially oriented at least about 2.5 to 1 in both directions.

* * * * *